Figure 1:
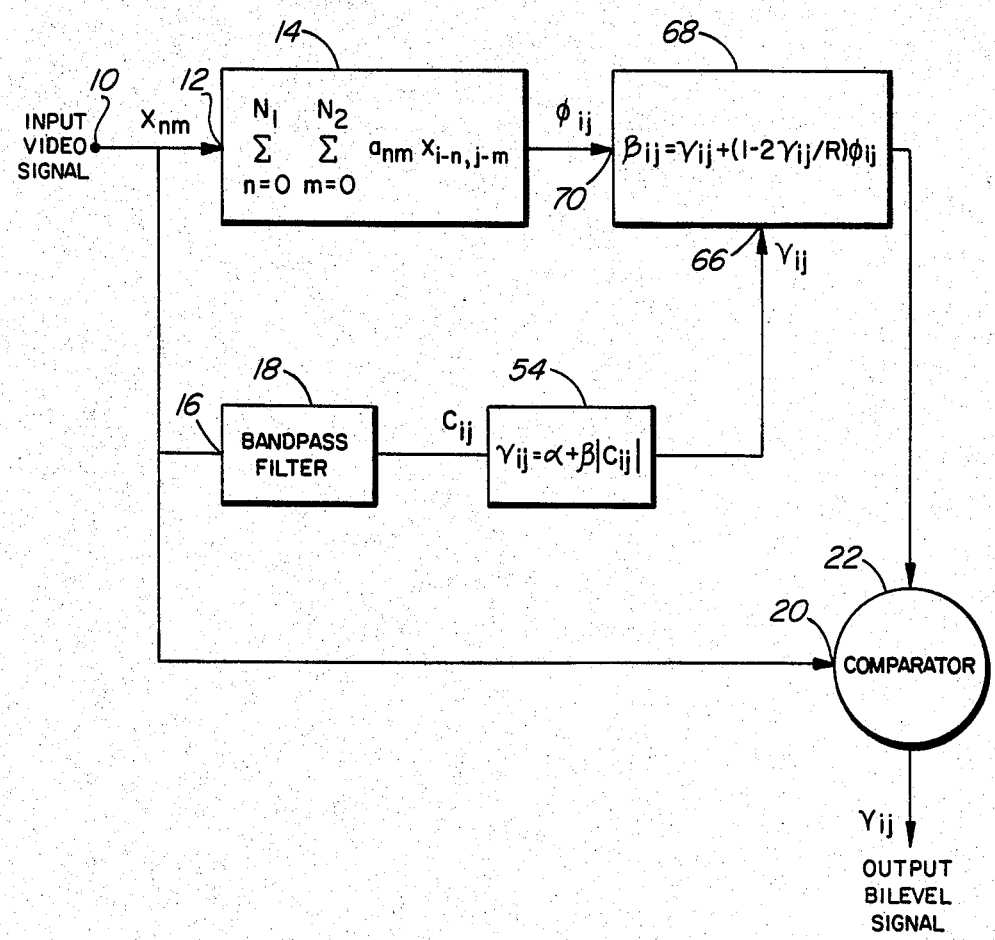

United States Patent [19]
Sabri

[11] Patent Number: 4,528,584
[45] Date of Patent: Jul. 9, 1985

[54] BILEVEL CODING OF COLOR VIDEO SIGNALS

[75] Inventor: Mohammed S. Sabri, Beaconsfield, Canada

[73] Assignee: Northern Telecom Limited, Montreal, Canada

[21] Appl. No.: 446,608

[22] Filed: Dec. 3, 1982

[51] Int. Cl.³ .............................................. H04N 9/32
[52] U.S. Cl. ........................................ 358/12; 358/13
[58] Field of Search .................................... 358/12, 13

[56] References Cited

U.S. PATENT DOCUMENTS 4,467,346 8/1984 Mori ...................................... 358/13

Primary Examiner—Richard Murray
Attorney, Agent, or Firm—Thomas Adams

[57] ABSTRACT

Bilevel coding of color video signals, for example video teleconference or NTSC broadcast television signals, is used to reduce the required storage capacity or transmission channel bandwidth. Each multi-level or continuous tone picture element in a frame is compared to a threshold and assigned one of two values depending upon whether or not it exceeds the threshold value. The threshold is produced by averaging the luminance components of neighboring picture elements and constraining the average by a signal derived from the chrominance of the original video signal. A significant feature is that the use of the chrominance signal in this way obviates the need, common to known monochrome systems, of adding noise (or dither signal) to the signal with concomitant picture degrading artifacts.

25 Claims, 2 Drawing Figures

BILEVEL CODING OF COLOR VIDEO SIGNALS

The invention relates to video signal processing, particularly to a method and apparatus for bilevel coding or representation of colour video signals, and is especially applicable to composite television signals, for example NTSC broadcast colour television signals.

Whether a video signal originates as a broadcast television signal or otherwise, for example in an interactive visual communications system using video terminals and telephone lines, the need often arises to code the signal to reduce the required storage capacity or transmission channel bandwidth. Also in television programme production it is sometimes desirable to create a stylized representation or a sketch of the picture for special effects or animation. A type of process evolved for this purpose is so-called "bilevel coding (representation)". In such a process, each multi-level or continuous tone point in the frame, or picture element (Pel), is represented in bilevel form, i.e. it can assume only one of two states, typically high or low. Consequently only one digital bit is required to represent each picture element and the receiver can be very simple.

Basically bilevel coding involves comparing the picture element intensity with a threshold value and, depending upon whether or not it exceeds the threshold, assigning a corresponding output signal to either a high or low state. Generally the threshold value is chosen, and hence varied, according to the content of an area of the picture surrounding or adjacent to the picture element being coded at a particular instant. Determination of the threshold value affects the ability to preserve grey scale rendition, apparent contrast and detail in the picture.

Hitherto bilevel coding has generally been limited to monochrome signals. One known process, known as the "ordered dither" technique is disclosed in a paper entitled "Design of dither waveforms for quantized visual signals", by J. O. Limb. Bell System Technical Journal No. 48, 1969 pp. 2555-2582 and a paper entitled "An optimum method for two level rendition of continuous tone pictures", by B. E. Bayer, ICC conference record, 1973 pp. 26-11, 26-15.

In this process a set of predetermined position-dependent thresholds are used to derive the bilevel picture elements or a random dither signal, for example noise, is added to the multilevel picture. The process is primarily suited to bilevel displays since an objectionable flicker is usually perceived if the signal is displayed on a television monitor. Also, the process is not satisfactory for colour television signals due to excessive high frequency components in the chrominance bands which overlap with the chrominance signal and distort it.

An alternative process, known as the "constrained average technique" is disclosed in U.S. Pat. No. 3,961,134 issued June 1, 1976, which is hereby incorporated by reference. In this process the threshold value is chosen as a function of the local average within an area surrounding the point or picture element. To produce an apparent grey scale the process utilizes noise in the video signal. To alleviate the reliance upon an indeterminate parameter a controlled amount of noise (dither) is added to the video signal, in effect utilizing the ordered dither technique. Accordingly, the resulting picture suffers from the same problems of flicker and chrominance band distortion.

An object of the present invention is to eliminate or at least mitigate these problems in providing a process and apparatus for bilevel coding of a colour video signal.

According to one aspect of the present invention a process for bilevel coding of a colour video signal includes the steps of:

(i) deriving from a plurality of picture elements a first signal proportional to the luminance component of the colour video signal;

(ii) deriving a second signal proportional to the chrominance component of the colour video signal;

(iii) computing from the first and second signals a threshold value;

(iv) comparing a picture element value to the threshold value and deriving an output signal having one of two states in dependence upon whether or not the picture element value exceeds the threshold value.

In preferred embodiments of the invention the signal proportional to the luminance component is a weighted constrained average ($\phi_{ij}$), computed, for example, in accordance with the equation $$\phi_{ij} = \sum_{n=0}^{N_1} \sum_{m=0}^{N_2} a_{nm} X_{i-n, j-m}$$

where X is the pel value and $a_{nm}$ is the weighting coefficient chosen to the signal proportional to the luminance.

Then the chrominance-proportional signal ($C_{ij}$), which acts as a dither signal producing an apparent grey scale, is used to derive a contrast enhancement factor $X_{ij}$ thus:

$$\gamma_{ij} = \alpha + \beta |C_{ij}|$$

where $\alpha$ and $\beta$ are constants. Conveniently $\alpha$ is in the range 5-20, preferably 10, and $\beta$ is in the range 0.5-2, preferably 1.0. $|C_{ij}|$ denotes the absolute value or magnitude of $C_{ij}$.

The threshold value $B_{ij}$ is then computed as:

$$B_{ij} = \gamma_{ij} + (1 - 2\gamma_{ij}/R)\phi_{ij}$$

Where $\gamma_{ij}$ is the contrast enhancement factor and R is the maximum range of the video signal, for example 256 for an 8 bit digital signal.

According to another aspect, the invention comprises apparatus for implementing the process of the first aspect. Thus, said apparatus comprises:

means for deriving from a plurality of picture elements a first signal proportional to the luminance component of the colour video signal;

means for deriving a second signal proportional to the chrominance component of the colour video signal;

means for computing from the first and second signals a threshold value; and means for comparing a picture element value to said threshold value to derive an output signal having one of two states in dependence upon whether the picture element value exceeds the threshold value or not.

Means for deriving the chrominance-proportional signal may conveniently comprise a bandpass filter having a pass band encompassing the chrominance subcarrier frequency $f_{sc}$. Such bandpass filter may be a one- or two-dimensional digital filter.

A particularly simple apparatus may be realized if the signal proportional to the luminance component is a weighted constrained $\phi_{ij}$ average of the form:

$$\phi_{ij} = \sum_{n=0}^{N_1} \sum_{m=0}^{N_2} a_{nm} X_{i-n, j-m}$$

and furthermore if the weighting coefficient $a_{nm}$ is substantially unity and $N_1$ is an integer multiple of the subcarrier cycles. Thus if a sampling frequency of $3f_{sc}$ were used, $N_1$ would be multiples of three.

Figure 2:
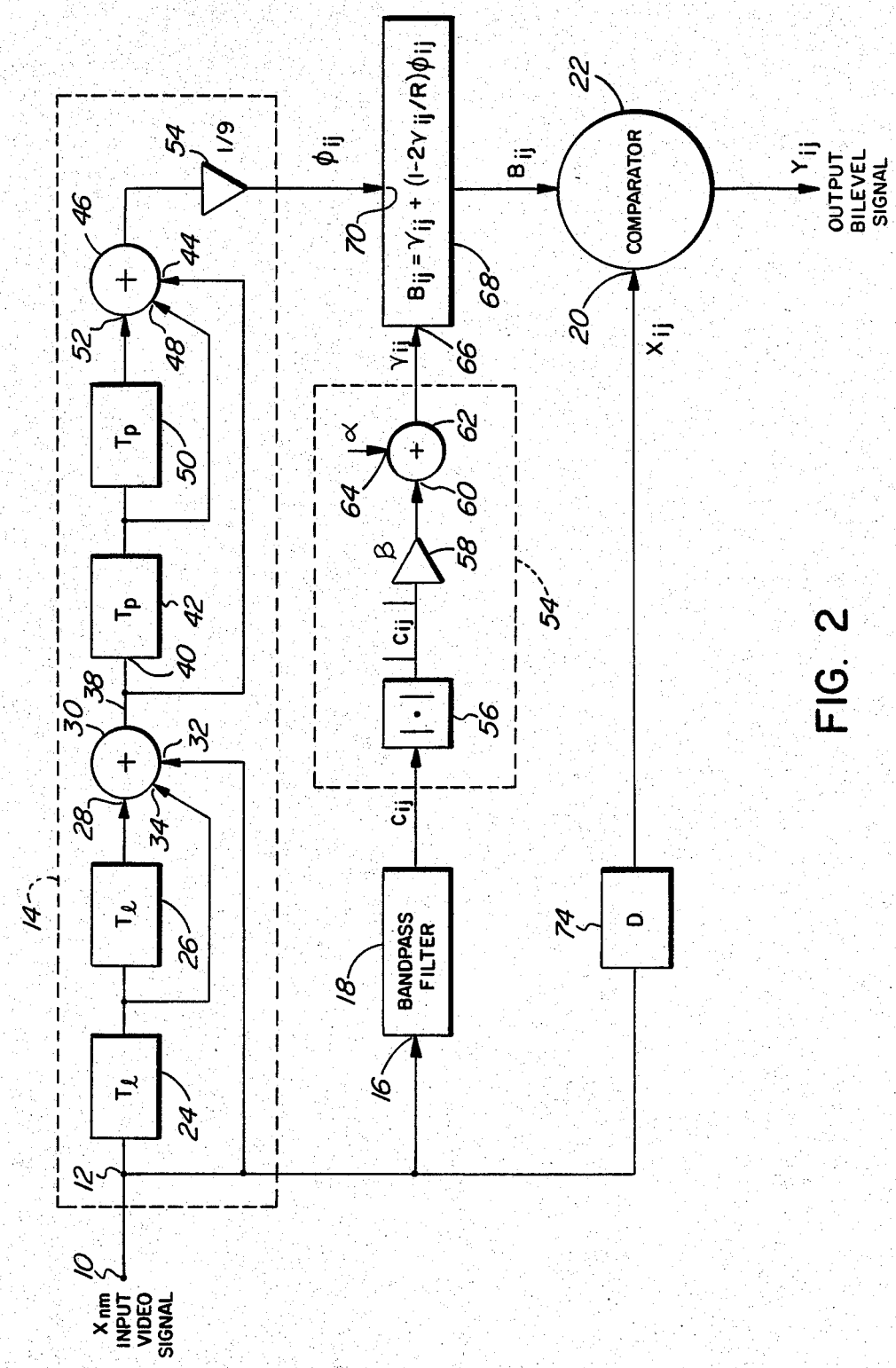

An exemplary embodiment of the invention will now be described with reference to the accompanying drawings, in which:

FIG. 1 is a schematic block representation of apparatus for bilevel coding of a colour video signal; and FIG. 2 is a more detailed representation of the apparatus for a sampling frequency triple the colour subcarrier frequency.

It should be understood that although the input video signal can be analog or digital, for the specific embodiment the input signal is in digital form, for example 8 bits, and could be derived from a store, wherein it is stored still in digital form, or could be derived from a camera or other such source with an intervening analog/digital converter to convert it to the digital format required for input to the apparatus. The output bilevel signal will be decoded in the receiver. Since the receiver decoding circuit is known, it too is not shown in the drawing. Typically the receiver will comprise a standard monitor with a one bit digital/analog converter.

Referring to FIG. 1, apparatus for bilevel coding an NTSC composite colour video signal comprises an input terminal 10 to which is applied the digital video signal to be encoded sampled at three times the colour subcarrier frequency $f_{sc}$. The input terminal 10 is connected to, respectively, an input 12 of summing means 14, an input 16 of a bandpass filter 18 and an input 20 of a comparator 22. The summing means 14 serves to compute from the input picture elements $X_{ij}$ a constrained weighted average $\phi_{ij}$ according to the formula:

$$\phi_{ij} = \sum_{n=0}^{N_1} \sum_{m=0}^{N_2} a_{nm} X_{i-n, j-m}$$

$X_{i-n, j-m}$ is the picture element preceding the particular element being encoded. As can be seen from FIG. 2, summing means 14 is adapted to sum nine preceding picture elements to produce the weighted constrained average $\phi_{ij}$. Thus, summing means 14 comprises two delays 24 and 26, each equal to the duration of one line scan of the signal. The delays 24 and 26 are connected in series between the input 12 and one input 28 of an adder 30. The input 12 also is connected directly to an input 32 of the adder 30. A third input 34 of the adder 30 is connected to the output 36 of the first delay 24. The output of the adder 30, on line 38, is applied to the input 40 of a delay 42, equal to the duration of one picture element (Pel). Line 38 also is connected to an input 44 of a second adder 46. The output of the Pel delay 42 is applied to a second input 48 of the adder 46 and to a second Pel delay 50, the output of which is applied to a third input 52 of the adder 46. The output of adder 46 is connected to a divider 54, where the summed signal is divided by nine to give the signal $\phi_{ij}$ proportional to the luminance of the composite colour video signal $X_{ij}$. For this case the individual coefficients $a_{nm}$ for each delay or Pel is equal to one ninth. Sampling at $3f_{sc}$, the sequence of values of each three successive picture elements will be $Y+I$, $$Y - \frac{I}{2} + \frac{\sqrt{3}}{2} Q \text{ and } Y - \frac{I}{2} - \frac{\sqrt{3}}{2} Q.$$

where Y is the luminance component and I and Q are the chrominance components. It will be seen that when these are summed the resultant is proportional to luminance only.

As will be described more fully hereafter, other proportions can be used depending upon sampling frequency and number of samples.

Bandpass filter 18 is a one-or two-dimensional digital filter arranged to pass the chrominance signal, $C_{ij}$. The centre frequency of the passband is $f_{sc}$, where $f_{sc}$ is the subcarrier frequency. The output of the filter 18 is connected to the input of means 54 for deriving a contrast enhancement factor proportional to the absolute value of $C_{ij}$ plus a constant $\alpha$. Means 54 comprises a device 56 for deriving the magnitude, (in effect a rectifier), the output of which is applied by way of an multiplier 58, having a multiplication factor $\beta$, to an input 60 of an adder 62. A second input 64 of the adder 62 is connected to a reference source having a value $\alpha$. The output $(\gamma_{ij})$ of the adder 62 is connected to an input 66 of means 68 for computing the threshold value $B_{ij}$ according to the equation:

$$B_{ij} = \gamma_{ij} + (1 - 2\gamma_{ij}/R)\phi_{ij}$$

Where $\gamma_{ij}$ is the contrast enhancement factor and R is the maximum range of the video signal, for example 256 for an 8 bit digital signal.

A second input 70 of means 68 is connected to the output of divider 54. The output of computing means 68 is applied to a second input 72 of comparator 22. The input signal from terminal 12 is applied to the first input 20 of the comparator by way of a delay 74, equal to the delay of the bandpass filter 18. The output of the comparator 22 constitutes the output bilevel signal for storage and/or transmission.

As mentioned previously, the means 14 derives the weighted constrained average $\phi_{ij}$ from nine picture elements in a $3 \times 3$ matrix. The last element, in a conventional scan at the corner of the matrix, is the element $X_{ij}$ applied also to the comparator 22 and hence compared with the threshold value $B_{ij}$. The output bilevel signal $Y_{ij}$ will be high ($S_1$) if the element intensity $X_{ij}$ exceeds $B_{ij}$ and low ($S_0$) if it does not.

As mentioned previously, the values of $a_{nm}$ can be chosen to render a signal proportional to luminance only, even though it has other than nine samples and a different sampling frequency. For example, at four times the colour subcarrier sampling frequency ($4f_{sc}$) the coefficients for $a_{nm}$ can be:

$$\frac{1}{16} \begin{bmatrix} -1 & 0 & 2 & 0 & -1 \\ 2 & 0 & 12 & 0 & 2 \\ -1 & 0 & 2 & 0 & -1 \end{bmatrix}$$

It should be appreciated that although the specific description is for a digital video signal, the invention is not limited to digital signals but also comprehends analog signal processing. Then means for deriving the luminance-related signal could be a low pass filter, means for deriving the contrast enhancement factor could be a rectifier, amplifier and adder or summing amplifier, and means for computing the threshold value $B_{ij}$ would use suitable analog devices.

It will also be appreciated that for some applications, such as stylized single frame images, the invention need not be embodied using the precise circuit element described hereinbefore, but could be put into practice using a microprocessor.

With suitable modification the invention could be applied to component colour video signals, i.e. in which the luminance and chrominance components have previously been separated.

A significant advantage of using the chrominance signal to constrain the averaged luminance signal is that the video signal reproduced can be kept relatively free from objectionable artifacts such as flicker or distorted colour. It will be appreciated that to add noise as in the various dither techniques mentioned in the introduction will generally degrade picture quality.

What is claimed is:

1. Video signal processing apparatus comprising means for bilevel coding discrete picture elements of a colour video signal having a luminance component and a chrominance component, including:
   means for deriving from a plurality of picture elements including at least one picture element other than the picture element to be encoded a first signal, ($\phi_{ij}$), proportional to said luminance component;
   means for deriving a second signal ($C_{ij}$) proportional to said chrominance component;
   means for computing from said the first and second signals a threshold signal ($B_{ij}$) and
   a comparator for comparing said picture element to be encoded with said threshold value and providing an output signal $Y_{ij}$ having either one of two states in dependence upon whether or not said picture element exceeds said threshold value.

2. Video signal processing apparatus as defined in claim 1, wherein said means for deriving a luminance-proportional signal comprises means for computing a weighted average ($\phi_{ij}$) of the luminance and chrominance components of a plurality of picture elements.

3. Video signal processing apparatus as defined in claim 2, wherein said means for computing is adapted to compute said weighted average $\phi_{ij}$ in accordance with the formula $$\phi_{ij} = \sum_{n=0}^{N_1} \sum_{m=0}^{N_2} a_{nm} X_{i-n, j-m}$$

where $a_{nm}$ is a weighting factor and $X_{i-n, j-m}$ adjacent picture elements' values.

4. Video signal processing apparatus as defined in claim 2, wherein said means for deriving said luminance-proportional signal is arranged to compute said signal from a plurality of neighbouring picture elements.

5. Video signal processing apparatus as defined in claim 4, wherein said plurality of neighbouring picture elements comprise a 3×3 matrix including said picture element to be encoded.

6. Video signal processing apparatus as defined in claim 5, wherein said means for deriving said luminance-proportional signal comprises two line delays connected serially between the input and an adder, the input being connected directly to one adder input, the output of the first delay connected to a second adder input and the second line delay connected to a third adder input.

7. Video signal processing apparatus as defined in claim 6, further comprising two picture element delays connected serially between the output of said adder and a first input of a second adder, the output of the first adder being connected to a second input of the second adder and the output of the first picture element delay being connected to a third input of the second adder.

8. Video signal processing apparatus as defined in claim 1, wherein said means for deriving a chrominance-proportional signal comprises a bandpass filter having a pass band to pass the chrominance signal.

9. Video signal processing apparatus as defined in claim 8, wherein said filter comprises a one- or two-dimensional digital filter.

10. Video signal processing apparatus as defined in claim 8 wherein said means for deriving a chrominance-proportional signal further comprises means responsive to the output of the filter for providing a contrast enhancement factor $\gamma_{ij}$.

11. Video signal processing apparatus as defined in claim 10, wherein said means for providing said contrast enhancement factor is arranged to do so in accordance with the formula $\gamma_{ij} = \alpha + \beta |C_{ij}|$ where $|C_{ij}|$ is the magnitude of $C_{ij}$ and $\alpha$ and $\beta$ are constants.

12. Video signal processing apparatus as defined in claim 11, wherein $\alpha$ is in the range 5 to 20.

13. Video signal processing apparatus as defined in claim 12, wherein $\alpha$ is equal to 10.

14. Video signal processing apparatus as defined in claim 11, wherein $\beta$ is in the range 0.5 to 2.0.

15. Video signal processing apparatus as defined in claim 14, wherein $\beta$ is equal to 1.

16. Video signal processing apparatus as defined in claim 1, wherein said means for computing said threshold signal $B_{ij}$ is arranged to do so in accordance with the formula $B_{ij} = \gamma_{ij} + (1 - 2\gamma_{ij}/R)\phi_{ij}$ where $\gamma_{ij}$ is a contrast enhancement factor related to said chrominance-proportional signal and R is the maximum range of the video signal.

17. A process for bilevel coding of a colour video signal having a luminance component and a chrominance component comprising the steps of:
   (i) deriving from a plurality of picture elements including one or more picture elements other than the picture element to be encoded a first signal ($\phi_{ij}$) proportional to said luminance component of the video signal;
   (ii) deriving a second signal ($C_{ij}$) proportional to said chrominance component;
   (iii) computing from said first and second signals ($\phi_{ij}$) and ($C_{ij}$) a threshold value;
   (iv) comparing said picture element to be encoded with said threshold value and providing an output having either one of two states in dependence upon whether or not said picture element exceeds said threshold value.

18. A process as defined in claim 17, wherein the step of deriving a luminance-proportional signal includes computing a weighted average of a plurality of picture elements.

19. A process as defined in claim 18, wherein said weighted average $\phi_{ij}$ is computed in accordance with the relationship $$\phi_{ij} = \sum_{n=0}^{N_1} \sum_{m=0}^{N_2} a_{nm} X_{i-n,j-m}$$

where $a_{nm}$ is a weighting coefficient and $X_{i-n,j-m}$ the values of said plurality of picture elements.

20. A process as defined in claim 19, wherein said plurality of picture elements comprises with the elements to be encoded a 3 by 3 matrix.

21. A process as defined in claim 19, wherein said threshold value $B_{ij}$ is computed in accordance with the relationship $B_{ij} = \gamma_{ij} + (1-2\gamma_{ij}/R) \phi_{ij}$ where $R$ is the maximum range of the video signal.

22. A process as defined in claim 17, wherein said signal $C_{ij}$ is derived by extracting the chrominance signal by means of a bandpass filter whose centre frequency is at $f_{sc}$.

23. A process as defined in claim 22, wherein a contrast enhancement factor $\gamma_{ij}$ is computed from the signal $C_{ij}$ in accordance with the relationshp $\gamma_{ij} = \alpha + \beta |C_{ij}|$ where $\alpha$ is in the range 5 to 10, $\beta$ is in the range 0.5 to 2.0, and $|C_{ij}|$ is the absolute value of $C_{ij}$.

24. A process as defined in claim 23, wherein $\alpha$ is equal to 10.

25. A process as defined in claim 22, wherein $\beta$ is equal to unity.

* * * * *